N. PODGOURSKY.
WATER LEVEL INDICATOR.
APPLICATION FILED MAR. 30, 1912.

1,092,388.

Patented Apr. 7, 1914.

Witnesses:
B. Dommers
E. Leckert.

Inventor.
Nicholaus Podgoursky,
By Henry Orth
Atty.

UNITED STATES PATENT OFFICE.

NICHOLAUS PODGOURSKY, OF ST. PETERSBURG, RUSSIA.

WATER-LEVEL INDICATOR.

1,092,388.  Specification of Letters Patent. Patented Apr. 7, 1914.

Application filed March 30, 1912. Serial No. 687,448.

*To all whom it may concern:*

Be it known that I, NICHOLAUS PODGOURSKY, a subject of the Emperor of Russia, and a resident of St. Petersburg, Russia, first lieutenant of the Russian Marine, have invented a new and useful Water-Level Indicator, of which the following is a specification.

The automatic signaling apparatus according to my invention is intended to indicate the appearance and disappearance of water in the compartments of ships, more particularly of large men-of-war and merchantmen.

My invention essentially comprises a float mounted on an arm connected to a hermetically closed casing which rotates on trunnions and contains a pendulum contact adapted to close and open an electric circuit when the casing rotates, the commutator being switched into the general electric circuit or into the circuit of a separate battery, so that when the float rises owing to the inflow of water and the casing is turned, the circuit is automatically closed, and operates an optical, acoustic or other signal.

Figure 1:
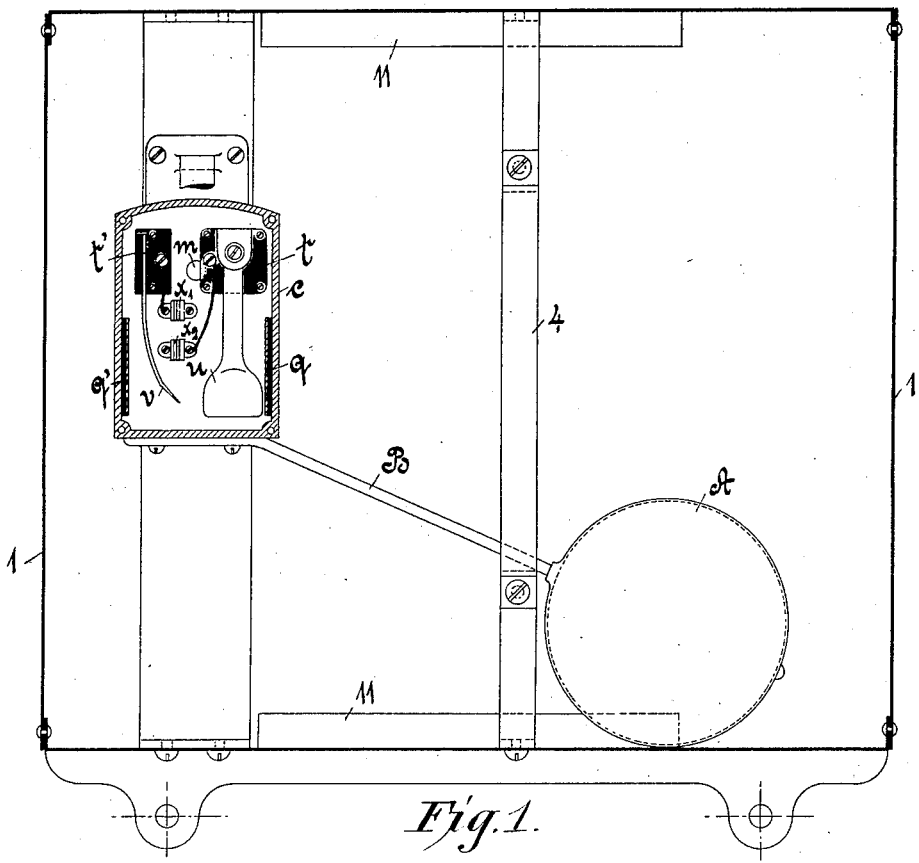
Figure 2:
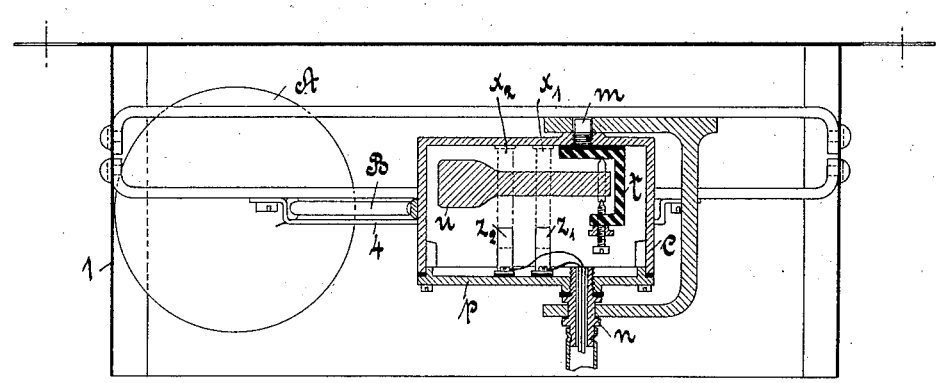
Figure 3:
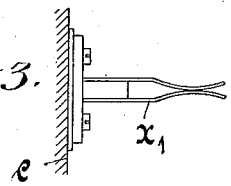

On the annexed drawings, Figure 1 is a vertical sectional view of the apparatus; Fig. 2 a vertical section shown perpendicularly to the view of Fig. 1; Fig. 3 is a detail view on an enlarged scale.

The apparatus is arranged in a casing 1 protecting it from mechanical shocks.

The apparatus consists of a float A having the shape of a water-tight ball mounted on an arm B passing through a bracket 4 which guides it and limits its oscillations. The arm B is connected either to the casing $c$, or to its cover, the casing itself being pivoted on trunnions $m$ and $n$ in bearings, rotates on the said trunnions when the ball A rises or descends. The casing $c$ is closed in an air tight manner by a cover $p$, and the trunnion $n$ is provided with a conduit through which is introduced into the casing the end of a flexible two-wire conductor. In the interior of the casing is arranged on an insulated support $t$, a pendulum $u$, and on an insulated support $t'$, a spring $v$. Opposite the pendulum $u$ and the spring $v$ are secured insulated contacts $q$ and $q'$. The flexible conductor is introduced through the cap or through the hollow trunnion $n$ on the inner side of the cover $p$ and is screwed to the insulated supports which terminate in knife edges $z'$ and $z^2$. When the cover $p$ is placed on the casing $c$, the knife edges $z'$ and $z^2$ pass between springs $x'$ and $x^2$ which are fixed separately to the casing (Fig. 3) and connected: one to the support $t$ and the other to the support $t'$.

When there is no water in the compartment, and the ball A occupies its lowest position, the pendulum $u$ does not touch the spring $v$. On the water rising in the compartment it passes through openings 11 in the casing 1, the ball A rises and turns the casing $c$, so that the pendulum, while retaining its vertical position, comes into contact with the spring, and thus closes the circuit which results in the signal being operated.

It must be pointed out that in the constructions described, the details can be changed in various ways without departing from this invention.

What I claim is—

1. The combination with a chamber accessible to water, a water-tight casing pivoted in said chamber, a rigid arm connected to said casing, a float on the arm, an electric circuit having terminals in said casing one of which is a relatively stationary flexible terminal and the other a pivoted terminal, said pivoted terminal arranged to swing into contact with said flexible terminal when the casing is rotated by the float.

2. A water-tight casing, trunnions for mounting said casing one of which is tubular, a cover for the casing having knife contacts thereon and to which electric wires passing through the tubular trunnion are secured, spring contacts in the casing engaged by the knife contacts, a pendulum in the casing electrically connected to one of said spring contacts and a spring in the path of the pendulum connected to the other contact.

In testimony whereof, I have signed my name to this specification in the presence of two subscribing witnesses.

NICHOLAUS PODGOURSKY.

Witnesses:
H. A. LOVIAGUINE,
A. N. FECTERALOFF.

Copies of this patent may be obtained for five cents each, by addressing the "Commissioner of Patents, Washington, D. C."